(12) United States Patent
Hecking

(10) Patent No.: US 6,932,108 B2
(45) Date of Patent: Aug. 23, 2005

(54) PRESSURE REDUCER

(75) Inventor: Willi Hecking, Mönchengladbach (DE)

(73) Assignee: Hans Sasserath & Co KG, Korchenbroich (DE)

( * ) Notice: Subject to any disclaimer, the term of this patent is extended or adjusted under 35 U.S.C. 154(b) by 205 days.

(21) Appl. No.: 10/418,942

(22) Filed: Apr. 17, 2003

(65) Prior Publication Data

US 2004/0206401 A1 Oct. 21, 2004

(51) Int. Cl.$^7$ .............................................. G05D 16/08
(52) U.S. Cl. ............... 137/505; 137/454.6; 137/505.18; 251/96; 251/296
(58) Field of Search ............................ 137/505, 505.18, 137/454.6; 251/96, 296

(56) References Cited

U.S. PATENT DOCUMENTS

| | | | | |
|---|---|---|---|---|
| 3,392,749 A | * | 7/1968 | Gneiding et al. | 137/484.6 |
| 4,760,862 A | * | 8/1988 | Mutou et al. | 137/315.05 |
| 5,358,004 A | * | 10/1994 | Atkinson et al. | 137/505.18 |
| 5,771,921 A | * | 6/1998 | Johnson | 137/505 |
| 5,899,439 A | * | 5/1999 | Gottwald et al. | 251/288 |
| 5,960,818 A | * | 10/1999 | Hecking | 137/218 |

FOREIGN PATENT DOCUMENTS

| | | | |
|---|---|---|---|
| EP | 0650109 A1 | * | 10/1994 |
| EP | 0681126 A1 | * | 4/1995 |

* cited by examiner

Primary Examiner—Stephen M. Hepperle
(74) Attorney, Agent, or Firm—Mallinckrodt & Mallinckrodt; Robert R. Mallinckrodt

(57) ABSTRACT

A pressure reducer has a housing with inlet and outlet sockets, a partition between said inlet and outlet sockets, and an accommodation socket. The partition defines an aperture aligned with the accommodation socket. A pressure reducer insert is inserted into the accommodation socket and the aperture. The pressure reducer insert has a tapering, funnel-like insert housing, a valve seat, and webs for connecting the insert housing with a valve seat sealingly mounted in the aperture. A regulating diaphragm closes the open end to define a controlled pressure chamber which communicates with an outlet chamber. A cap encloses a biased helical spring and a bias setting threaded spindle rotatably mounted in the cap. A setting knob is axially movable between a first position non-rotatably coupled with the cap, and a second position rotatable relative to the cap where rotation of the knob rotates the bias setting spindle and adjusts the pressure setting.

11 Claims, 4 Drawing Sheets

PRESSURE REDUCER

FIELD OF INVENTION

The invention relates to a pressure reducer. Pressure reducers serve to reduce the pressure of water flowing in a water system. The pressure is kept on a selected value.

BACKGROUND OF THE INVENTION

EP 0,650,109 A1 describes a pressure reducer with a housing fitting having an inlet socket and an outlet socket. The inlet socket and the outlet socket are aligned and define a common axis and serve to install the housing fitting in a water pipe. The housing fitting has a partition with an aperture. Furthermore, the housing fitting has an accommodation socket, the axis of which is normal to the common axis of the inlet and outlet sockets. The accommodation socket is aligned with the aperture in the partition.

A pressure reducer insert is accommodated by the accommodation socket and by the aperture. This pressure reducer insert has a tapering insert housing. The insert housing has an open wide end and a narrow end. The open wide end is closed by a regulating diaphragm. The regulating diaphragm is connected to a valve stem, which is sealingly guided out of the narrow end of the insert housing. A valve seat is connected with the insert housing through webs. This valve seat is sealingly mounted in the aperture of the partition. The valve stem extends through the valve seat and carries a valve head at its downstream end. The valve seat and the valve head represent a regulating valve. The outlet pressure downstream of the regulating valve is transmitted to a controlled pressure chamber defined by the insert housing and the regulating diaphragm.

The regulating diaphragm is biased, on the outside of the controlled pressure chamber by a helical compression spring. The compression spring abuts a spring abutment. The compression spring and the spring abutment are contained in an inverted pot-shaped cap. A treaded spindle is mounted centrally in the cap. The spring abutment is guided on the spindle and, at the time is held against rotation in the cap. Therefore, when the spindle is rotated, the spring abutment is moved longitudinally, thereby changing the bias of the helical spring and, consequently, the set value of the controlled outlet pressure.

A sieve extends between the insert housing and the partition around the valve seat. Thereby, any dirt contained in the inflowing water is removed and kept away from the regulating value.

A tie rod extends through a longitudinal bore of the threaded spindle and is connected to the valve stem in a way, that the movement of the diaphragm is substantially not impeded. The tie rod carries a stop at its end which permits free movement of the tie rod and, thereby, of the diaphragm, during the normal operation of the pressure reducer.

The pressure reducer mechanism with spring abutment, spring, diaphragm, insert housing valve stem and valve seat forms a cartridge, which can be removed, as a whole, from the housing fitting for servicing, cleaning the sieve or replacement. When the pressure reducer mechanism is removed in this way, the tie rod serves to keep the whole mechanism together. In this state, the stop engages the end face of the spindle.

If the outlet pressure increases above the set pressure, the force on the regulating diaphragm will overcome the bias of the helical spring. The valve head will move towards the valve seat, whereby the downstream pressure will be reduced.

In the pressure reducer of EP 0,650,109 A1 the spindle is connected to a setting knob, which permits rotation of the spindle and, thereby, variation of the spring bias. When the spring bias and, thereby, the controlled output pressure has been properly set, the spindle is clamped to the cap by means of a nut.

This procedure of loosening the nut, rotating the knob and then re-tightening the nut is cumbersome. If the nut has not been properly tightened, the spindle may be unintentionally rotated and the spring bias misadjusted.

DISCLOSURE OF THE INVENTION

It is an object to the invention to facilitate the setting of the controlled outlet pressure of a pressure reducer in which the pressure reducer mechanism is a cartridge removable as a whole from a housing fitting.

It is another object of the invention to safeguard, in such a pressure reducer, against misadjustment and longitudinal movement of the spindle, when the cartridge has been removed from the housing fitting.

To this end, the pressure reducer has a housing fitting defining an inner chamber and having inlet port means and outlet port means and a partition between said inlet and outlet port means, said partition dividing said inner chamber into an inlet chamber and an outlet chamber, and socket means integral with said housing fitting and communicating with said inlet chamber, said partition defining an aperture aligned with said socket. Pressure reducer insert means are inserted into said socket and said aperture. Said pressure reducer insert means comprise a tapering insert housing having an open wide end and a narrow end. A regulating diaphragm closes said open wide end to define a controlled pressure chamber. The pressure reducer insert means further comprise a valve seat and web means for connecting said insert housing with said valve seat, said valve seat being sealingly mounted in said aperture in said partition, passage means for communicating said outlet chamber with said controlled pressure chamber, valve closure means, and valve stem means for connecting said regulating diaphragm and said valve closure means, said valve stem means extending through said valve seat and carrying said valve closure means downstream of said valve seat, said valve closure means and said valve seat cooperating to maintain an outlet pressure in said outlet chamber at said selected value. Cap means have an open end with an open end edge and have a substantially closed end. Said cap means are retained with their open end edge in said socket means. Said cap means enclose a biased helical spring, a spring abutment and bias setting threaded spindle means rotatably mounted in said cap means. Said spindle means have a longitudinal bore therethrough and have an end face remote from said regulating diaphragm. Said spring abutment is guided on said threaded spindle means and is non-rotatably guided in said cap means. Said biased helical spring abuts said spring abutment and acts upon said diaphragm to urge said diaphragm, said valve stem means and said valve closure means towards an open position. Tie rod means hold said valve seat, said valve closure means and said pressure reducer insert means together to permit removal thereof from said housing. Said tie rod means extend through said longitudinal bore and have a first end on the side of said regulating diaphragm and a second end remote from said regulating diaphragm. There are means for connecting said first end with said valve stem means in a way substantially not impeding free mobility of the regulating diaphragm, and stop means provided at said second end and cooperating with said spindle end face, said stop means, in normal operation of said pressure reducer, being spaced from said spindle end face.

To achieve the objects stated above, setting knob means are mounted on said cap means. Said setting knob means are axially movable between a first and a second position and are non-rotatably coupled with said cap means, in their first position, and are rotatable relative to said cap means, in their second position. Said spindle means are axially movably but non-rotatably guided in said setting knob means. There are clip means for axially locking said spindle means to said cap means.

With this design, the setting knob means are axially movable to their second position to permit rotation of the setting knob means and, thereby, of the spindle means. The setting knob means can be pushed back to their first position to lock the spindle means. With the axial movement of the setting knob means, it is no longer possible to affix the spindle means to the setting knob means. Therefore, without further measures, the spindle means would be axially movable, when the pressure reducer cartridge is removed from the housing fitting. Therefore, clip means are provided for axially locking said spindle means to said cap means.

In a preferred embodiment of the invention, said cap means have a substantially cylindrical structure with a circumferential slot therein. Said setting knob means have a skirt extending over part of said cylindrical structure remote from said housing fitting, said skirt, in said first position, covering said circumferential slot and, in said second position, permitting access to said slot. Said clip means being inserted into said slot for axially locking said spindle means to said cap means, when said setting knob means are in their second position, and being covered by said skirt, when said setting knob means are in their first position.

Said clip means comprise an integral clip element having a circular disc-shaped handle portion and two substantially parallel legs, said legs being defined by a substantially semicircular inner cutout and opposite, flaring edges communicating with said semicircular inner cutout. Said spindle means have a reduced diameter neck portion and said clip means are snapped over said reduced diameter neck portion along said flaring edges, with said semicircular cutout tightly holding said reduced diameter neck portion. Said spindle means have an outwardly extending shoulder adjacent said reduced diameter neck portion. Said semicircular cutout, on its inner side, communicates with a longitudinal slot provided in said clip element.

Said cap means have a substantially cylindrical housing with an end face remote from said housing fitting. Said end face has an aperture and said spindle means pass through said aperture. An upstanding collar having an end face is provided on said end face, said upstanding collar having a first toothed ring on said end face. Said setting knob means have a second toothed ring facing said first toothed ring and engage said first toothed ring, when said setting knob means are in their first position.

Said setting knob means have a skirt extending over said upstanding collar and part of said cylindrical structure remote from said housing fitting. Said upstanding collar has radially extending cam means. Said skirt has inwardly extending lugs cooperating with said cam means to provide two axially spaced latch positions of said setting knob means representing said first and second positions thereof.

Said setting knob means have an inverted pot-shaped structure with a bottom portion and said skirt, a collar being provided inside said inverted pot-shaped structure and coaxial with said skirt, said collar defining guide means for non-rotatably guiding said spindle means relative to said setting knob means.

An embodiment of the invention will be described in greater detail hereinbelow with reference to the accompanying drawings.

DESCRIPTION OF PREFERRED EMBODIMENT

Figure 1:
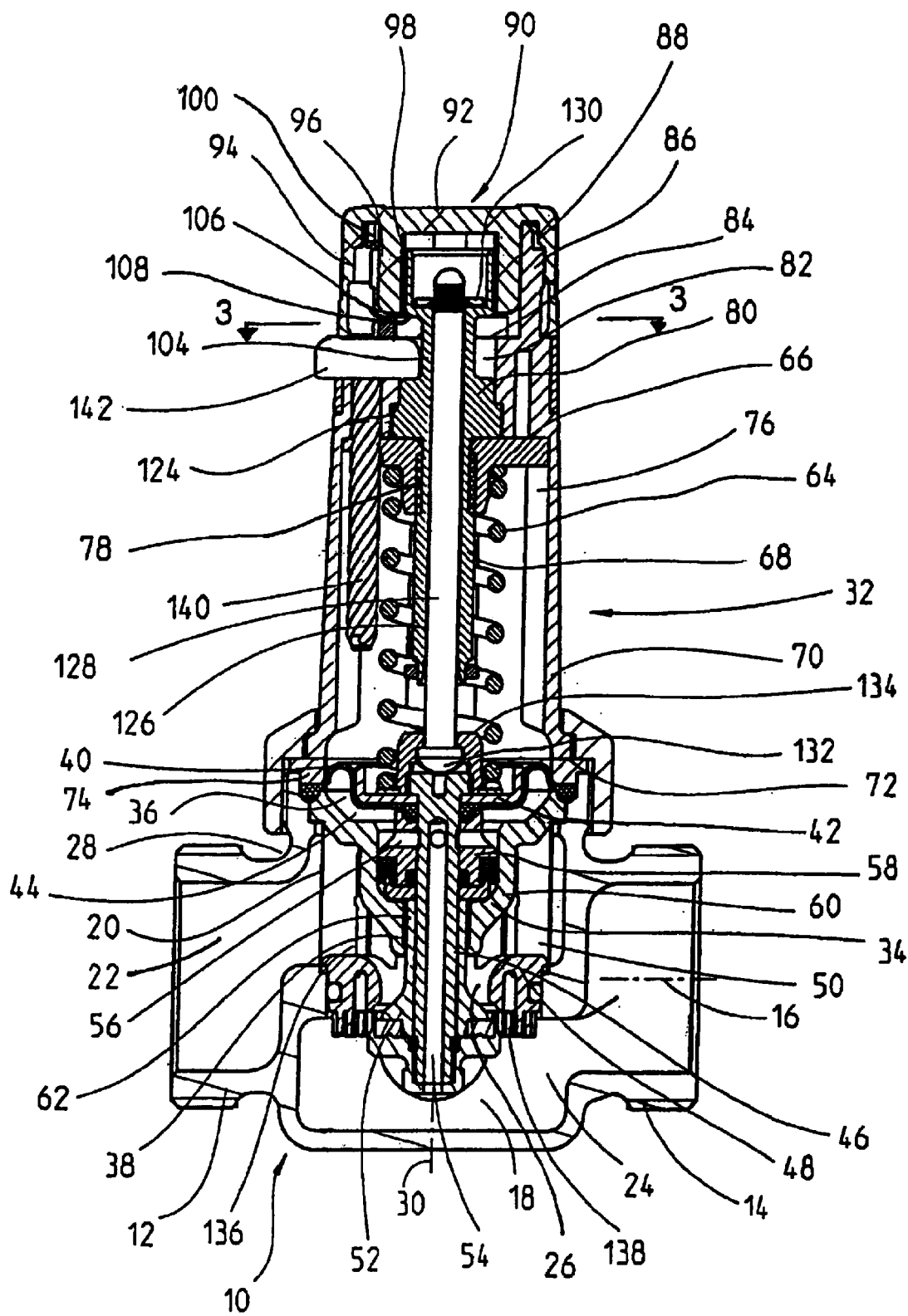
FIG. 1 is a longitudinal sectional view of a pressure reducer of the invention.

Referring first to FIG. 1, numeral 10 designates a housing fitting. The housing fitting has an inlet socket 12 and an outlet socket 14. The inlet socket 12 and the outlet socket 14 are aligned with a common axis 16. The housing fitting 10 defines an inner chamber 18. A partition 20 subdivides the inner chamber 18 into an inlet chamber 22 and an outlet chamber 24, the inlet chamber communicating with the bore of the inlet socket 12, and the outlet chamber communicating with the bore of the outlet socket 14. Inlet socket 12 and outlet socket 14 represent inlet and outlet port means, respectively. The partition 20 has an aperture 26. The housing fitting, furthermore, has an integral accommodation socket 28. The accommodation socket 28 is aligned with the aperture 26. The axis 30 of the accommodation socket 28 and of the aperture 26 is normal to the axis 16 of the inlet and outlet sockets 12 and 14, respectively. The accommodation socket 28 and the aperture 26 accommodate a pressure reducer insert 32. The pressure reducer insert 32 is a cartridge-like unit, which is adapted to be inserted into and removed from the housing fitting 10 as a whole to permit, for example, easy cleaning of a sieve or other servicing.

The pressure reducer insert 32 has a tapering or funnel-shaped insert housing 34. The insert housing 34 has a wide, open upper end 36 and a lower end 38. The open end is closed by a regulating diaphragm 40 with a diaphragm disc 42. The diaphragm 40 and the insert housing 34 define a controlled pressure chamber 44, i.e. a chamber in which the controlled pressure prevails. A valve stem 46 is connected to the diaphragm 40 and the diaphragm disc 42.

An annular valve seat 48 is connected to the insert housing 34 through webs 50. This valve seat 48 is retained in the aperture 26 of the partition 20. The valve stem 46 extends through the valve seat 48 and carries a valve head 52 at its downstream end. The valve stem has a longitudinal passage 54, which communicates with the controlled pressure chamber 44 through radial passages 56. The valve stem carries a piston 58, adjacent the diaphragm 40, which is sealingly guided in a cylindrical portion 60 of the insert housing 34. The area of the end faces of the piston 58 are equal to the effective area of the valve head 52. The valve stem 46 with a collar of the valve head 52 surrounding the valve stem 46 pass with clearance through an aperture 62 in the bottom of the insert housing 34. Thus the piston is exposed, on its lower side, as viewed in FIG. 1, to the inlet pressure and is exposed, on its upper side, to the outlet pressure prevailing in the controlled pressure chamber 44. Thereby, the pressures acting on the valve head 52 are compensated for.

A helical spring 64 abuts a spring abutment 66. The spring abutment 66 is guided by a threaded spindle 68. The spindle 68 and the valve stem 46 extend along the axis 30. The spring 64, the spring abutment 66 and the spindle 68 are covered by a substantially cylindrical cap 70. The cap has an open lower end with an edge 72. This edge is placed on the insert housing. In the present embodiment, the rim of the diaphragm is clamped by a clamping ring 74, and the edge 72 is placed on this ring. The cap has longitudinal ledges 76. The spring abutment 66 is non-rotatably guided in the cap 70 by these ledges 76. Therefore, when the threaded spindle 68 is rotated, the spring abutment 66, which is guided on the spindle 68 with a threaded bore 78 will be moved longitudinally in the cap 70. Thereby, the compression of the spring 64 is changed and, consequently, the force acting on the diaphragm 40 in the downward direction.

Figure 4:
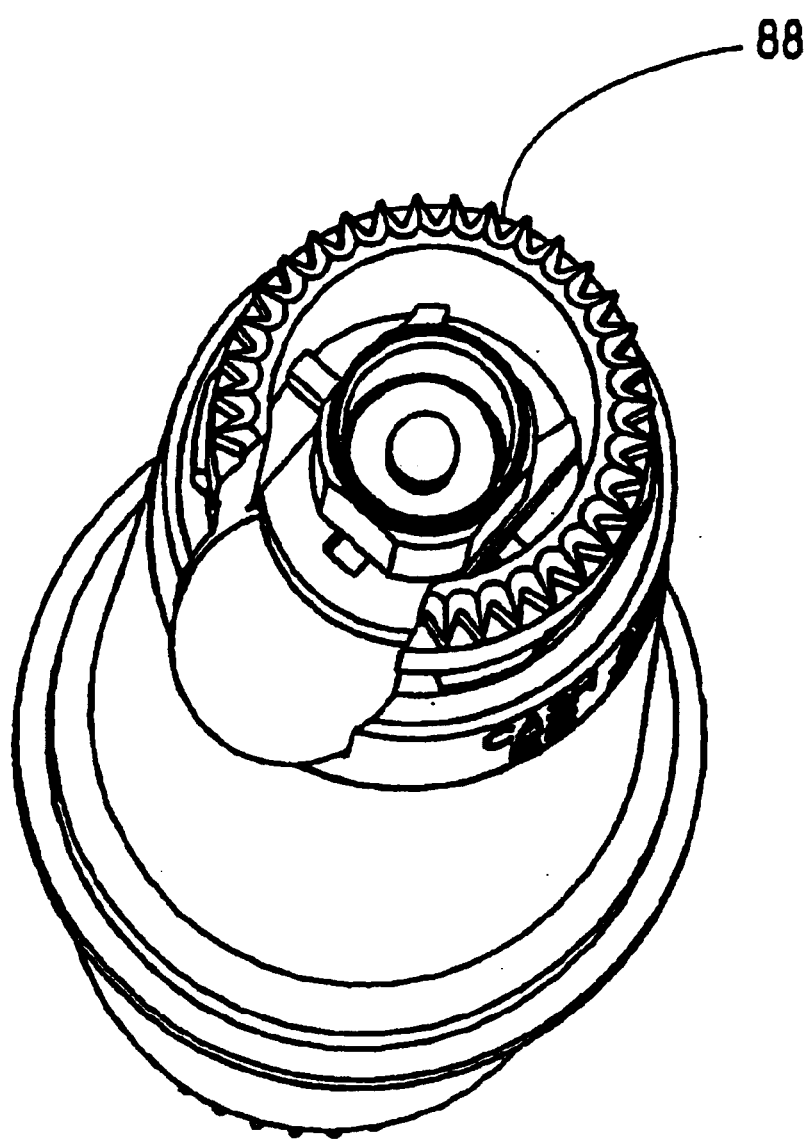
FIG. 4 is a perspective view of the top portion of the pressure reducer of FIG. 1 with the setting knob removed.
Figure 5:
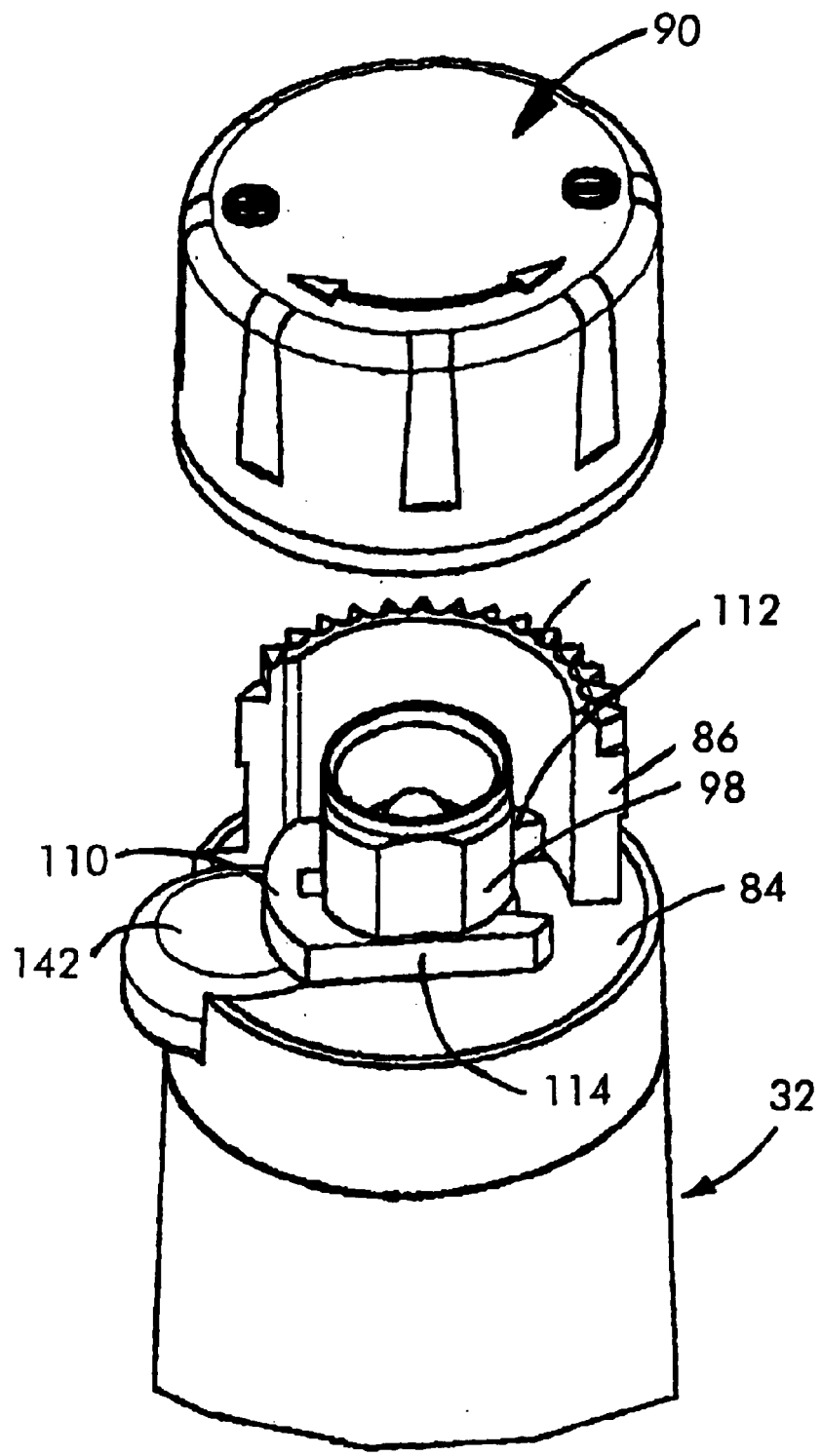
FIG. 5 is a further perspective view of the top portion of the pressure pressure reducer of FIG. 1.

As shown in FIG. 1, the spindle 68 has a larger diameter, non-threaded head 80 which is longitudinally guided in a stepped bore 82 in the top of the cap 70. This top has relatively large thickness and defines an end face 84. Projecting from the end face 84 is a coaxial upstanding collar 86. The collar 86 has a toothed ring 88, as can be seen best from FIGS. 2 and 4. A setting knob 90 is placed over the collar 86. The setting knob 90 has an end disc 92 and a peripheral skirt 94. The outer diameter of the skirt 94 is substantially equal to the outer diameter of the cap 70. The setting knob 90 with the end disc and the skirt 94 represent an inverted pot-shaped structure. Projecting from the inner surface of the end disc 94 or bottom of the pot-shaped structure is a collar 96. This collar 96 has a non-circular cross section and guides a projecting end 98 of the spindle 68. This end 98 extends into the collar 96 and is axially movable therein but cannot be rotated relative to the collar 96.

A toothed ring 100 complementary to the toothed ring 88 is provided on the inner surface of the end disc 92 between the skirt 94 and the collar 96. When the setting knob 90 is in its first position shown in FIG. 1, the toothed ring 100 of the setting knob 90 meshes with the toothed ring 88 on the collar 86 of the cap 32. In this first position, the setting knob cannot be rotated and, therefore, cannot re-adjust the spindle 68. When the setting knob is in its second position shown in FIG. 2, it is lifted from the end face 84 of the cap 70. In this second position, the toothed rings 88 and 100 are disengaged. Therefore, the setting knob 90 can be rotated. The setting knob 90, when rotated, rotates the spindle 68, and is coupled with the setting knob both in the first and in the second position thereof. The upstanding collar 86 has a cam structure 99, FIG. 2, on its outer surface. This cam structure 99 cooperates with projections 101 on the inner surface of the skirt 94 to define two axially spaced latch positions of the setting knob 90. One of these latch positions represents the above mentioned "first" position, and the other one represents the above mentioned "second" position of the setting knob 90. The setting knob is resiliently retained in each of these positions.

This construction permits easy adjustment of the spindle 68 just by pulling the setting knob 90 up, and permits easy locking of the spindle 68 simply by pushing the setting knob down.

However, contrary to the prior art pressure reducer discussed above, the spindle 68 is not affixed to the setting knob and, therefore, the axial spindle position is not defined.

Figure 3:
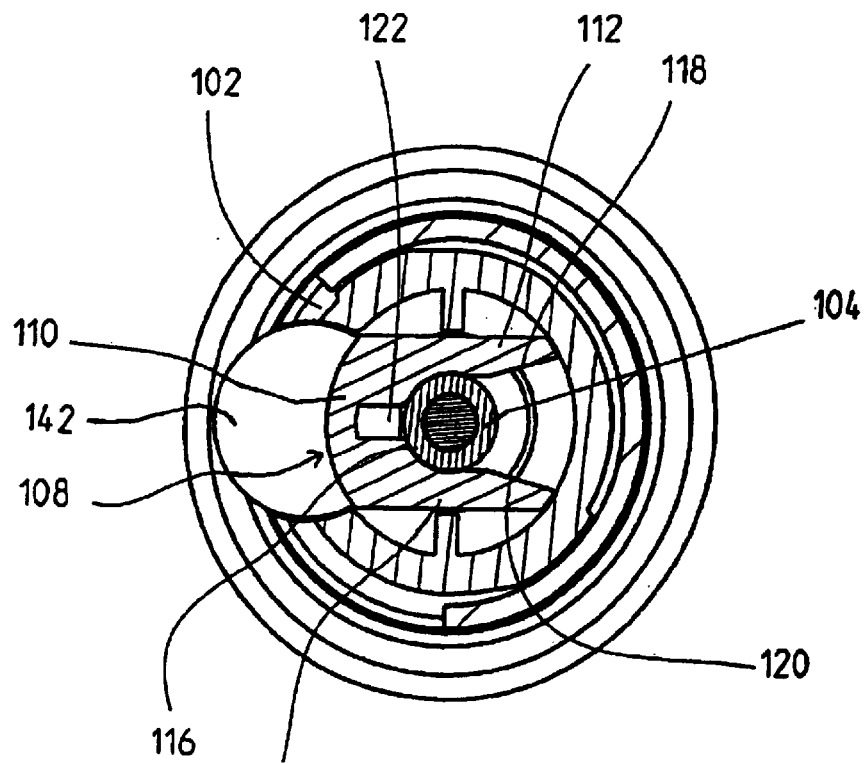
FIG. 3 is a sectional view taken on the line 3—3 of FIG. 1.

Therefore, clip means are provided for axially holding the spindle 68, while permitting rotation of the spindle 68. A circumferential slot 102 is provided in the upstanding collar 86 of the cap 32, as can be seen best from FIG. 3. The spindle head 80 has an integral, smaller-diameter neck 104. A flange 106 connects the neck 104 with the projecting end 98. This flange 106 forms a shoulder of the outer surface of the spindle head 80. This shoulder lies substantially in the plane of the upper edge of the circumferential slot 102, while the lower edge of the slot is substantially in the plane of the end face 84 of the cap 70. A clip element 108 can be inserted through the circumferential slot 102. This clip element 108 can be seen best in FIG. 3. The clip element 108 has a circular disc-shaped handle portion 110 (FIG. 3) and two substantially parallel legs 112 and 114. The legs are defined by a substantially semicircular inner cutout 116 and opposite, flaring edges 118 and 120 communicating with this semicircular inner cutout 116. The clip element 108 is snapped over the reduced diameter neck portion 104 of the spindle head 80 along the flaring edges 118, 120, with the semicircular cutout 116 tightly surrounding reduced diameter neck portion 104. The semicircular cutout 116, on its inner side, communicates with a longitudinal slot 122 provided in clip element 108.

Figure 2:
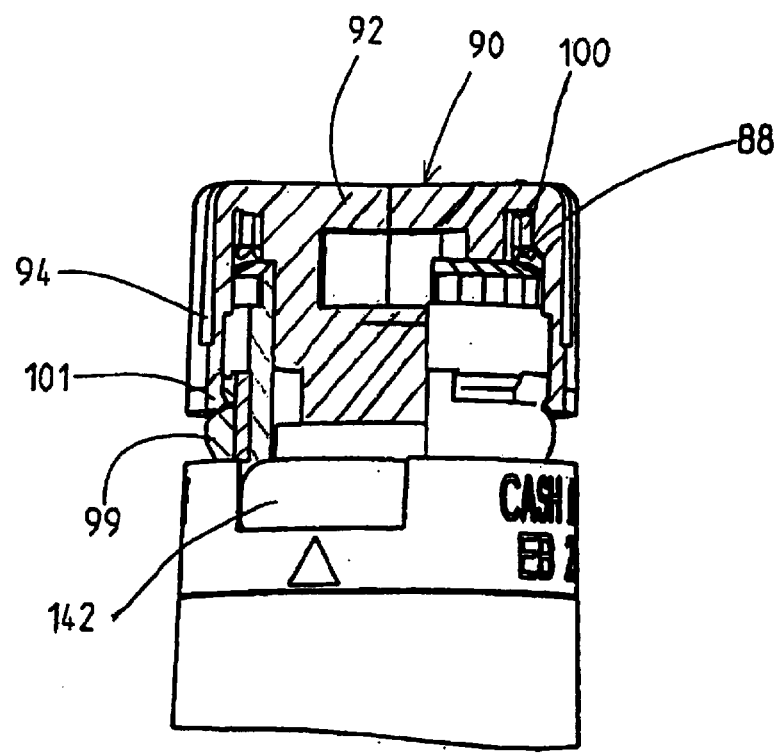
FIG. 2 is a fragmentary elevational view of the top portion of the pressure reducer of FIG. 1, with a portion broken away to show internal parts.

When the setting knob is in its second, lifted position illustrated in FIG. 2, the skirt 94 of the setting knob 90 permits free access to the circumferential slot 102. The clip can be inserted into the slot and snapped over the reduced diameter neck portion 104 of the spindle head 80. Then the lower surface of the clip element 108 engages the end face 84 of the cap and the edges of the circumferential slot 102, and the upper surface of the clip element 108 engages the shoulder-forming flange 106 of the spindle head 80. In this way, the spindle 68 is held against downward movement by the flange 106 engaging the clip element 108, while upward movement of the spindle 68 is limited by the spindle head 80 engaging a shoulder 124 of the stepped bore 82. When the setting knob is in its first, pushed-down position, it covers the circumferential slot and the clip element.

A longitudinal bore 126 extends through the spindle 68 and spindle head 80. A tie rod 128 extends through this bore 126. The tie rod 128 carries a stop member 130 at its upper end. This stop member 130 is movable within the collar 96 and the hollow upstanding end 98. The lower end of the tie rod 128 carries a hemispherical head 132. The hemispherical head is retained in a hat-shaped nut 134 threaded onto the end of valve stem 46 which is tightened against diaphragm disc 42. The free movement of the diaphragm 40 and diaphragm disc 42 is not impeded by the tie rod 128 in normal operation of the pressure reducer. The tie rod is easily movable in the longitudinal bore 126 and within the cavity defined by the hollow upstanding end. When the pressure reducer insert 32 is removed from the housing fitting 10, the tie rod keeps the structure together and the helical spring 64 tensioned.

Numeral 136 designates a cylindrical sieve which is placed between the insert housing 34 and the valve seat 48.

The valve seat 48 is provided with a multitude of axially projecting pins 138 at its underside. These pins 138 represent flow dividing means for avoiding cavitation and noise caused thereby. Such pins are disclosed in greater detail in EP 0,698,838 B2.

A steep-thread spindle 140 is rotatably mounted eccentric in the cap 68. The spring abutment 66 is guided, with a steep-thread threaded bore on this steep-thread spindle 140. Thereby, the steep-thread spindle 140 is rotated, when the spring abutment 66 is moved axially. This rotation can be read on a wheel 142 attached to the steep-thread spindle 140. Such indicating device is disclosed in greater detail in EP 0,681,126 B2.

Whereas the invention is here illustrated and described with reference to embodiments thereof presently contemplated as the best mode of carrying out the invention in actual practice, it is to be understood that various changes may be made in adapting the invention to different embodiments without departing from the broader inventive concepts disclosed herein and comprehended by the claims that follow.

I claim:

1. A pressure reducer for reducing to a selected value the pressure of water flowing in a water system, comprising:

a housing fitting defining an inner chamber and having inlet port means and outlet port means and a partition between said inlet and outlet port means, said partition dividing said inner chamber into an inlet chamber and an outlet chamber, and socket means integral with said housing fitting and communicating with said inlet chamber, said partition defining an aperture aligned with said socket, pressure reducer insert means inserted into said socket and said aperture, said pressure reducer insert means comprising a tapering insert housing having an open wide end and a narrow end, and a regulating diaphragm closing said open wide end to define a controlled pressure chamber, a valve seat and web means for connecting said insert housing with said valve seat, said valve seat being sealingly mounted in said aperture in said partition;

passage means for communicating said outlet chamber with said controlled pressure chamber;

valve closure means, and valve stem means for connecting said regulating diaphragm and said valve closure means, said valve stem means extending through said valve seat and carrying said valve closure means downstream of said valve seat, said valve closure means and said valve seat cooperating to maintain an outlet pressure in said outlet chamber at said selected value;

cap means having an open end with an open end edge and having a substantially closed end, said cap means being retained with its open end edge on said insert housing; said cap means enclosing a biased helical spring, a spring abutment and bias setting threaded spindle means rotatably mounted in said cap means, said spring abutment being guided on said threaded spindle means and being non-rotatably guided in said cap means, said biased helical spring abutting said spring abutment and acting upon said diaphragm to urge said diaphragm, said valve stem means and said valve closure means towards an open position, and setting knob means mounted on said cap means, said setting knob means being axially movable between a first and a second position and being non-rotatably coupled with said cap means, in their first position, and being rotatable relative to said cap means, in their second position; said spindle means being axially movably but non-rotatably guided in said setting knob means; and clip means for axially locking said spindle means to said cap means.

2. A pressure reducer as claimed in claim 1 and further comprising said spindle means having a longitudinal bore therethrough and having an end face remote from said regulating diaphragm tie rod means for holding said valve seat, said valve closure means and said pressure reducer insert means together to permit removal thereof from said housing, said tie rod means extending through said longitudinal bore and having a first end on the side of said regulating diaphragm and a second end remote from said regulating diaphragm, means for connecting said first end with said valve stem means in a way substantially not impeding free mobility of the regulating diaphragm, and stop means provided at said second end and cooperating with said spindle end face, said stop means, in normal operation of said pressure reducer, being spaced from said spindle end face.

3. A pressure reducer insert to be removably inserted into a housing fitting, which is installed in a water pipe, comprising:

a tapering insert housing having an open wide end and a narrow end, and a regulating diaphragm closing said open wide end to define a controlled pressure chamber, a valve seat and web means for connecting said insert housing with said valve seat, said valve seat being sealingly mounted in said aperture in said partition;

passage means for transmitting controlled outlet pressure to said insert housing;

valve closure means, and valve stem means for connecting said regulating diaphragm and said valve closure means, said valve stem means extending through said valve seat and carrying said valve closure means downstream of said valve seat, said valve closure means and said valve seat cooperating, in operation, to maintain an outlet pressure at a selected value;

cap means having an open end with an open end edge and having a substantially closed end, said cap means being retained with its open end edge on said insert housing, said cap means enclosing a biased helical spring, a spring abutment and bias setting threaded spindle means rotatably mounted in said cap means, said spring abutment being guided on said threaded spindle means and being non-rotatably guided in said cap means, said biased helical spring abutting said spring abutment and acting upon said diaphragm to urge said diaphragm, said valve stem means and said valve closure means towards an open position, setting knob means mounted on said cap means, said setting knob means being axially movable between a first and a second position and being non-rotatably coupled with said cap means, in its first position, and being rotatable relative to said cap means, in its second position; said spindle means being axially movably but non-rotatably guided in said setting knob means; and clip means for axially locking said spindle means to said cap means.

4. A pressure reducer as claimed in claim 3 and further comprising said spindle means having a longitudinal bore therethrough and having an end face remote from said regulating diaphragm, tie rod means for holding said valve seat, said valve closure means and said pressure reducer insert means together to permit removal thereof from said housing, said tie rod means extending through said longitudinal bore and having a first end on the side of said regulating diaphragm and a second end remote from said regulating diaphragm, means for connecting said first end with said valve stem means in a way substantially not impeding free mobility of the regulating diaphragm, and stop means provided at said second end and cooperating with said spindle end face, said stop means, in normal operation of said pressure reducer, being spaced from said spindle end face.

5. A pressure reducer insert as claimed in claim 3, wherein said cap means has a substantially cylindrical structure having a circumferential slot therein, said setting knob means have a skirt extending over part of said cylindrical structure remote from said housing fitting, said skirt, in said first position, covering said circumferential slot and, in said second position, permitting access to said slot, said clip means being inserted into said slot for axially locking said spindle means to said cap means, when said setting knob means are in their second position, and being covered by said skirt, when said setting knob means are in their first position.

6. A pressure reducer insert as claimed in claim 5, wherein said clip means comprise an integral clip element having a circular disc-shaped handle portion and two substantially parallel legs, said legs being defined by a substantially semicircular inner cutout and opposite, flaring edges communicating with said semicircular inner cutout, said spindle means having a reduced diameter neck portion, said clip means being snapped over said reduced diameter neck portion along said flaring edges, with said semicircular cutout tightly surrounding said reduced diameter neck portion.

7. A pressure reducer insert as claimed in claim 6, wherein said spindle means have an outwardly extending shoulder adjacent said reduced diameter neck portion.

8. A pressure reducer insert as claimed in claim 6, wherein said semicircular cutout, on its inner side, communicates with a longitudinal slot in provided in said clip element.

9. A pressure reducer insert as claimed in claim 3, wherein said cap means have a substantially cylindrical housing with an end portion remote from said housing fitting, said end portion having a cap end face and an aperture and said spindle means passing through said aperture, an upstanding collar having a collar end face is provided on said cap end face, said upstanding collar having a first toothed ring on said collar end face, and said setting knob means have a second toothed ring facing said first toothed ring and engaging said first toothed ring, when said setting knob means are in their first position.

10. A pressure reducer insert as claimed in claim 9, wherein said setting knob means have a skirt extending over said upstanding collar, said upstanding collar has radially extending cam means, and said skirt has inwardly extending lugs cooperating with said cam means to provide two axially spaced latch positions of said setting knob means representing said first and second positions thereof.

11. A pressure reducer insert as claimed in claim 9, wherein said setting knob means have an inverted pot-shaped structure with a bottom portion and said skirt, a collar being provided inside said inverted pot-shaped structure and coaxial with said skirt, said collar defining guide means for non-rotatably guiding said spindle means relative to said setting knob means.

* * * * *